United States Patent
Li et al.

(10) Patent No.: US 9,118,598 B2
(45) Date of Patent: Aug. 25, 2015

(54) REDIRECTOR, RELAY, SYSTEM FOR CONFIGURING ROUTE INFORMATION AND METHOD FOR UPDATING ROUTE INFORMATION

(75) Inventors: Jijun Li, Shenzhen (CN); Jian Chen, Shenzhen (CN); Hongguang Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1380 days.

(21) Appl. No.: 12/415,044

(22) Filed: Mar. 31, 2009

(65) Prior Publication Data

US 2009/0185494 A1  Jul. 23, 2009

Related U.S. Application Data

(63) Continuation of application No. PCT/CN2007/002940, filed on Oct. 12, 2007.

(30) Foreign Application Priority Data

Dec. 27, 2006  (CN) .......................... 2006 1 0169702

(51) Int. Cl.
*G06F 15/173* (2006.01)
*H04L 12/717* (2013.01)
(Continued)

(52) U.S. Cl.
CPC ................ *H04L 45/42* (2013.01); *H04L 45/00* (2013.01); *H04L 45/02* (2013.01); *H04L 45/70* (2013.01)

(58) Field of Classification Search
CPC .......... H04L 45/00; H04L 45/02; H04L 45/28
USPC ....................................................... 709/242
See application file for complete search history.

(56) References Cited

U.S. PATENT DOCUMENTS 5,049,876 A    9/1991  Kahle et al.
6,496,484 B1  12/2002  Suzuki
(Continued)

FOREIGN PATENT DOCUMENTS

CN    1497902 A    5/2004
CN    1564544      1/2005
(Continued)

OTHER PUBLICATIONS

Perkins, C., RFC 3561. Ad hoc On-Demand Distance Vector (AODV) Routing. pp. 1-37. Jul. 2003.*
(Continued)

*Primary Examiner* — John MacIlwinen
(74) *Attorney, Agent, or Firm* — Staas & Halsey LLP (57) ABSTRACT

A redirector, a relay, a system for configuring route information, and a method for updating route information are disclosed herein. The redirector includes: a route storing module and a route indicating module. The redirector further includes: a monitoring module which is coupled to communicate with the route storing module and configured to monitor change of the route configuration information; and a notifying module which is coupled to communicate with the monitoring module and configured to send a notification to the intermediate node managed by the redirector, where the notification indicates that the route information corresponding to the changed route configuration information is invalid. Through the foregoing solution, after the route configuration information changes, a notification may be sent in time to indicate that the previously subscribed route indication information is invalid, thus better ensuring correct forwarding of the service request message and improving the QoS.

4 Claims, 7 Drawing Sheets

(51) Int. Cl.
H04L 12/701 (2013.01)
H04L 12/751 (2013.01)
H04L 12/721 (2013.01)

(56) References Cited

U.S. PATENT DOCUMENTS

| | | | |
|---|---|---|---|
| 7,801,857 B2 * | 9/2010 | Betts et al. | 707/628 |
| 2002/0027887 A1 | 3/2002 | Moriya | |
| 2003/0135556 A1 * | 7/2003 | Holdsworth | 709/206 |
| 2004/0100904 A1 | 5/2004 | Chander et al. | |

FOREIGN PATENT DOCUMENTS

| | | |
|---|---|---|
| EP | 1414199 | 4/2004 |
| EP | 1672851 | 6/2006 |

OTHER PUBLICATIONS

Rekhter et al., RFC 4271. A Border Gateway Protocol. Jan. 2006. pp. 1-104.*

Calhoun et al., Diameter Base Protocol. pp. 1-147. Sep. 2003.*

English translation of the Written Opinion of the International Searching Authority for International application No. PCT/CN2007/002940, mailed Dec. 20, 2007, 4 pgs.

European Patent Office Communication enclosing the extended European search report, pursuant to Rule 62 EPC, the supplementary European search report (Art. 153(7) EPC) and the European search opinion for application No. 07816554.5, dated Feb. 26, 2010, 6 pgs.

First Chinese Office Action issued by State Intellectual Property Office of the PRC for application No. 200610169702.8, dated Apr. 29, 2010, 4 pgs., partial English translation attached.

Calhoun, P., et al., "Diameter Base Protocol", Network Working Group, Sep. 2003, 131 pgs.

International Search Report from P.R. China in International Application No. PCT/CN2007/002940 mailed Dec. 20, 2007.

* cited by examiner

REDIRECTOR, RELAY, SYSTEM FOR CONFIGURING ROUTE INFORMATION AND METHOD FOR UPDATING ROUTE INFORMATION

CROSS-REFERENCE TO RELATED APPLICATIONS

This application is a continuation of International Application No. PCT/CN2007/002940, filed on Oct. 12, 2007. This application claims the benefit of Chinese Application No. 200610169702.8, filed on Dec. 27, 2006. The disclosure of the above applications is incorporated herein by reference in their entirety.

TECHNICAL FIELD

The present disclosure relates to a message sending technology in the communication field, and in particular, to a redirector, a relay, a system for configuring route information, and a method for updating route information.

BACKGROUND

The statements in this section merely provide background information related to the present disclosure and do not constitute prior art.

Since its inception, the network is operated on the basis of the Authentication Authorization Accounting (AAA) system. Currently, the Remote Access Dial up User Service (RADIUS) protocol is one of the most prevalent AAA protocols, and is applied widely by virtue of its simplicity, security, manageability, and extensibility. However, the protocol is defective in transmission based on User Datagram Protocol (UDP), simple packet discarding mechanism, lack of retransmission rules, centralized charging services, and so on. Consequently, the protocol may not be suitable for the current network and thus may need further improvement. The Diameter protocol (which is an upgrade of the RADIUS protocol) includes: basic protocol, Network Access Service (NAS) protocol, Extensible Authentication Protocol (EAP), Mobile Internet Protocol (Mobile IP) protocol, Ciphering Message Syntax (CMS) protocol, and so on. The Diameter protocol supports authentication, authorization, and accounting of the Mobile IP, NAS request and mobile agent. Like the RADIUS protocol, the Diameter protocol is implemented through Attribute-Value-Pair (AVP), namely, a triplet of Attribute-Length-Value. However, the Diameter protocol specifies the error processing and failover mechanism in detail, applies the Transmission Control Protocol/Stream Control Transmission Protocol (TCP/SCTP), supports distributed charging, and overcomes many weaknesses of the RADIUS protocol. Therefore, the Diameter protocol is a AAA protocol more suitable for future communication systems and has been used by the AAA workgroup of the Internet Engineering Task Force (IETF) as a next-generation AAA protocol standard.

The Diameter protocol includes many types of Diameter nodes, such as, Diameter client, Diameter server, Diameter relay, Diameter agent, Diameter redirector, and Diameter protocol converter. The Diameter relay retrieves information from the Diameter request message, and decides the next-hop Diameter node to which the message is sent according to the contents of the domain-based Diameter routing table. The Diameter relay modifies the route information of the messages that pass through the relay, without changing other contents in the messages. According to the contents of the Diameter routing table, the Diameter agent decides the next-hop Diameter node to which the message is sent. Besides, the Diameter agent can modify the contents in the message. The Diameter redirector handles the routing configuration of the Diameter message uniformly without performing application-layer processing for the message. When a Diameter node sends a request message to the Diameter redirector according to the configuration but is unable to determine how to route the message, the Diameter redirector adds the routing indication information into the response of the request message according to the detailed route configuration information. Thus, clearly notifying the next-hop Diameter node. The Diameter protocol converter is adapted to implement conversion between the RADIUS protocol and Diameter protocol, or conversion between the Terminal Access Controller Access Control System (TACACS+) and the Diameter protocol. Various Diameter nodes set up network connections through configuration, or auto discovery or capability negotiation to make up a Diameter network.

In massive AAA application, the configuration management tasks are complicated with increase of the Diameter nodes. Therefore, the Diameter protocol provides mechanisms such as dynamic discovery of the node and capability negotiation, thus enhancing flexibility of the protocol and facilitating configuration and management. Diameter redirection is a type of simplified routing. It provides an effective way of centralized configuration, and is very useful in the case that the routes need to be configured in a centralized way. A redirector provides services for all members of a group, without being responsible for the task of message relay between domains. Such a solution is superior in that when the structure of one member changes, the group does not need to provide route update for other members.

Figure 1:
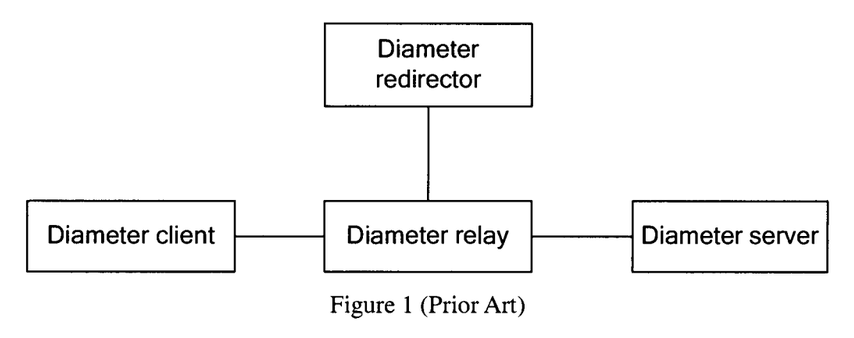
FIG. 1 shows a system structure of Diameter redirection messages in the prior art.

FIG. 1 shows a system structure of Diameter redirection messages in the related art. The Diameter client (such as network access server) generates a service request message for the user "bob@example.com", and sends the service request message to its Diameter relay. Supposing that the Diameter relay belongs to the "example.net" domain, the Diameter routing table of the Diameter relay lacks the routing ingress of the "example.com", and its default routing configuration is a Diameter redirector, then the Diameter relay sends a redirection request message to the Diameter redirector. The Diameter redirector queries the stored routing configuration information to obtain the contact mode of the Diameter server capable of processing the service request messages sent by the Diameter client. Through a redirection response, the information on the contact mode of the Diameter server is returned to the Diameter relay. The Diameter relay sets up a transmission connection with the Diameter server according to the contact mode information, and sends the service request message to the Diameter server. In FIG. 1, the next-hop node of the Diameter relay is a Diameter server. If the next-hop node of the Diameter relay is another Diameter relay, the information on the contact mode of the other Diameter relay is obtained through a redirection request message.

According to the basic protocol of the RFC3588, after receiving the redirection request message from the Diameter relay, the Diameter redirector queries the stored routing configuration information, and generates a redirection response according to the information and returns the response to the Diameter relay, where the response carries route information. The route information is denoted by a Redirect-Host-Usage Attribute Value Pair (AVP) and a Redirect-Max-Cache-Time AVP. The Redirect-Host-Usage AVP is of the enumeration type, and indicates how the Diameter relay uses the contents of the redirection response. The Redirect-Max-Cache-Time AVP indicates the peer table created by the Diameter relay for the redirection host and the validity period of the domain-based routing table. Both AVPs guide the Diameter relay how to process the redirection route information. Table 1 provides a reference about how to use the two AVPs.

TABLE 1

| AVP value | | Meaning |
| --- | --- | --- |
| DONT_CACHE | 0 | Default value, not buffered |
| ALL_SESSION | 1 | All matching messages are sent to the host specified by the redirection response; the matching is based on the Session-ID, domain, application, host, and user; in the non-zero response message of the Redirect-Host-Usage AVP, the Redirect-Max-Cache-Time AVP must exist, and is used for specifying the maximum seconds of buffering the redirection result. |
| ALL_REALM | 2 | |
| REALM_AND_APPLICATION | 3 | |
| ALL_APPLICATION | 4 | |
| ALL-HOST | 5 | |
| ALL_UAER | 6 | |

In Table 1, when the value of the Redirect-Host-Usage AVP is the default mode "DONT_CACHE(0)", it indicates that the receiver of the redirection response does not need to buffer the route information generated by the redirection response, and implies that all subsequent messages identical to the redirection request need to be requested from the redirector in order to obtain the redirection information. Other values of the Redirect-Host-Usage AVP indicate that the Diameter relay receiving the redirection response can buffer the received redirection message, and can forward the message directly along the route specified by the redirection message within a specific period (specified by the value of Redirect-Max-Cache-Time AVP) based on a domain, an application, certain sessions, or certain users, without the need of requesting the redirector. Upon expiry of the Redirect-Max-Cache-Time, the redirection route information in the buffer is deleted and the redirection request message is sent to the redirector again.

According to the foregoing method, in the redirection response returned by the redirector, all service messages with the corresponding route can be sent to the next-hop node "Redirect-Host" specified by the buffered route information directly in the subsequent part of the period if the value of Redirect-Host-Usage AVP is not DONT_CACHE(0). Namely, the domain- or application-based route information of the peer side can be buffered in a specific period, and in the specific period, all the service messages having the corresponding routing can be sent to the next-hop node specified by the buffered route information without sending any redirection request to the redirector again. In this case, when the route configuration information in the redirector changes, it may be very difficult to notify the node which has sent a redirection request message. The node which has sent a redirection request message sends a redirection request message to the redirector again to obtain the new route information only if the redirection route information expires or the next-hop Diameter node "Redirect-Host" fails which leads to impossibility of processing the service message. In cases where there is a strong requirement for real time message interaction and high Quality of Service (QoS), the related art has to wait for automatic expiry of the redirection route information at the end of the validity period of the redirection route information, which leads to application interruption and QoS deterioration.

SUMMARY

A redirector, a relay, a system for configuring route information, and a method for updating route information are provided in an embodiment of the present disclosure.

A redirector provided in an embodiment of the present disclosure includes:

a route storing module configured to store route configuration information about the route directed to each destination node;

a route indicating module communicated with the route storing module and configured to query route configuration information and generate route indication information carrying route information according to the route configuration information;

a monitoring module, communicated with the route storing module and configured to monitor change of the route configuration information; and a notifying module, communicated with the monitoring module and configured to send a notification to the intermediate node managed by the redirector, where the notification indicates that the route information corresponding to the changed route configuration information is invalid.

A relay provided in an embodiment of the present disclosure includes:

a forwarding module, configured to forward a service request message according to a route information;

a buffering module, communicated with the forwarding module and configured to buffer the route information;

a deleting module, communicated with the buffering module and configured to delete invalid route information;

a discarding module, configured to discard the notification about invalidity of route information; and a querying module, communicated with the discarding module, buffering module, and deleting module, and configured to query whether invalid route information is subscribed to: if invalid route information is subscribed to, notify the deleting module to delete the invalid route information; otherwise, send a notification about invalidity of route information to the discarding module.

Another relay provided in an embodiment of the present disclosure includes:

a forwarding module, configured to forward a service request message according to a route information;

a buffering module, communicated with the forwarding module and configured to buffer the route information;

a deleting module, communicated with the buffering module and configured to delete invalid route information; and an updating module, communicated with the buffering module and configured to update the invalid route information stored in the buffering module with new route information.

A system for configuring route information in an embodiment of the present disclosure includes:

a redirector, which includes: a route storing module, configured to store route configuration information about the route directed to each destination node; and a route indicating module communicated with the route storing module and configured to query the route configuration information, and generate route indication information carrying route information according to the route configuration information; and a relay, which includes: a forwarding module, communicated with the route indicating module and configured to forward a service request message according to the route information; a buffering module, communicated with the forwarding module and configured to buffer the route information; and a deleting module, communicated with the buffering module and configured to delete invalid route information.

The redirector further includes:

a monitoring module, communicated with the route storing module and configured to monitor change of the route configuration information; and a notifying module, communicated with the monitoring module, and configured to send a notification to the intermediate node managed by the redirector, where the notification indicates that the route information corresponding to the changed route configuration information is invalid.

The relay further includes:

a discarding module, configured to discard the notification about invalidity of route information; and a querying module, communicated with the discarding module, buffering module, deleting module, and the notifying module, and configured to query whether invalid route information is subscribed to: if invalid route information is subscribed to, notify the deleting module to delete the invalid route information; otherwise, send a notification about invalidity of route information to the discarding module.

Another system for configuring route information in an embodiment of the present disclosure includes:

a redirector, which includes: a route storing module, configured to store route configuration information about the route directed to each destination node; and a route indicating module, communicated with the route storing module and configured to query the route configuration information, and generate route indication information carrying route information according to the route configuration information; and a relay, which includes: a forwarding module, communicated with the route indicating module and configured to forward a service request message according to the route information; a buffering module, communicated with the forwarding module and configured to buffer the route information; and a deleting module, communicated with the buffering module and configured to delete invalid route information.

The redirector further includes:

a monitoring module, communicated with the route storing module and configured to monitor change of the route configuration information; and a notifying module, communicated with the monitoring module and the deleting module, and configured to send a notification to the intermediate node which requests route information, where the notification indicates that the route information corresponding to the changed route configuration information is invalid; and a route request storing module, communicated with the route indicating module and notifying module, and configured to store the address information of the intermediate node which requests route information, and the route configuration information corresponding to the requested route information.

A method for updating route information in an embodiment of the present disclosure includes:

sending a notification indicating that route information corresponding to route configuration information is invalid after detecting change of the route configuration information; and deleting the invalid route information according to the notification.

Based on the foregoing technical solution, the embodiments of the present disclosure bring the following technical benefits:

After the route configuration information in the redirector changes, the redirector may send a notification in time to all nodes managed by the redirector or the nodes which have subscribed to the route configuration information to indicate that the previously subscribed route indication information is invalid, and may further send new route indication information so that the route information stored in the relay is updated automatically, quickly, and timely, thus avoiding this consequence: The service request message is forwarded along the invalid route because the notification of the route information change is not made timely, and therefore, the service message is sent mistakenly. In cases where real time message interaction and high QoS are important, the present disclosure may overcome application interruption caused by the mistakenly sent service request. Compared with the related art, the present disclosure provides correct forwarding of the service request message and improves the QoS.

BRIEF DESCRIPTION OF THE DRAWINGS

The disclosures will become more fully understood from the detailed description given herein below for illustration only, and thus is not limitative of the disclosure, and wherein.

DETAILED DESCRIPTION

The following description is merely exemplary in nature and is not intended to limit the present disclosure, application, or uses.

In the embodiments of the present disclosure, a monitoring module is set in the redirector to monitor change of route configuration information. A route request storing module may be set to store the address information of the intermediate node which subscribes to the route information. When the route configuration information changes, the change is notified actively and timely to the intermediate nodes managed by the redirector or the intermediate nodes which have requested the route information corresponding to the changed route configuration information, the invalid route information is deleted in time, or further, the invalid route information is updated. Therefore, the system stops using the invalid route information and updates the route information in time. The embodiments of the present disclosure are applicable to the AAA protocol, and in particular, to the Diameter protocol.

Figure 2:
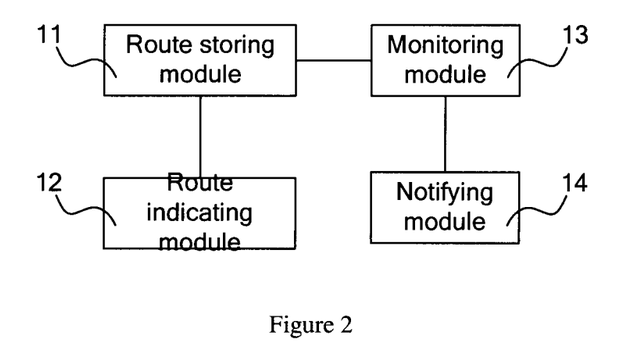
FIG. 2 shows an exemplary structure of a redirector provided in the first embodiment of the present disclosure.

FIG. 2 shows a structure of a redirector in the first embodiment of the present disclosure. The redirector includes: a route indicating module 12, a route storing module 11, a monitoring module 13, and a notifying module 14, as detailed below.

The route storing module 11 is adapted to store the route configuration information about the route directed to each destination node, where the route configuration information includes the information about the route from each intermediate node to each destination node.

The route indicating module 12 is adapted to: receive redirection request messages from each intermediate node; search the route storing module 11 for the corresponding route configuration information according to the redirection request message; and generate route indication information carrying route information according to the route configuration information, where the route indication information is sent to the intermediate node which sends the redirection request message to indicate how to route the service request message to the destination node.

The monitoring module 13 is adapted to: monitor the change of the route configuration information in the route storing module 11, and obtain new route information corresponding to the changed and new route configuration information from the route storing module 11.

The notifying module is adapted to send a notification to the intermediate node managed by the redirector, where the notification indicates that the route information corresponding to the changed route configuration information is invalid. Additionally, the notifying module 14 is also adapted to send the new route information intended for replacing the invalid route information to the intermediate node managed by the redirector.

Through the monitoring module, the change of the route configuration information can be monitored. Once change of the route configuration information is detected, the notifying module can notify the change to the intermediate node (namely, relay) managed by the redirector in time, thus avoiding this consequence: The service request message is forwarded along the invalid route because the notification of the route information change is not made timely, and therefore, the service message is sent mistakenly. In cases where real time message interaction and high QoS may be important, the present disclosure overcomes application interruption caused by the mistakenly sent service request.

Figure 3:
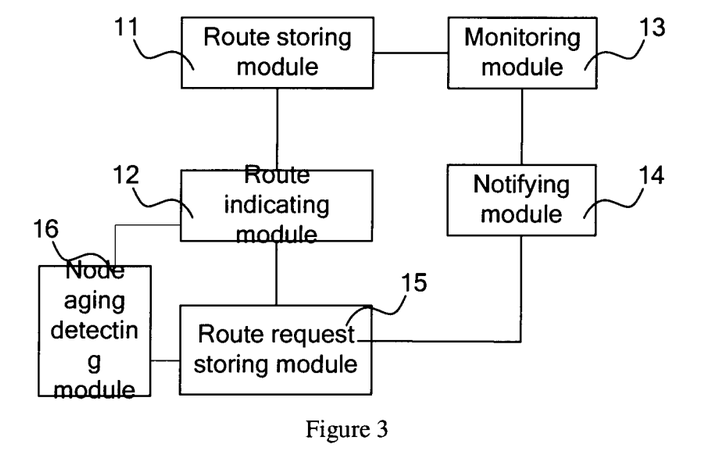
FIG. 3 shows an exemplary structure of a redirector provided in the second embodiment of the present disclosure.

FIG. 3 shows a structure of a redirector in the second embodiment of the present disclosure. The redirector further includes a route request storing module 15, which is communicated with the route indicating module 12 and the notifying module 14, and adapted to store address information of the intermediate node which requests route information (namely, redirection request message), and the route configuration information corresponding to the requested route information.

Accordingly, the notifying module 14 is adapted to send a notification about invalidity of route information to the intermediate node which requests the invalid route information according to the corresponding relation between the address information of the intermediate node in the route request storing module 15 and the route configuration information, without the need to send the notification about invalidity of route information to all intermediate nodes managed by the redirector.

Besides, the redirector also includes a node aging detecting module 16, which is communicated with the route request storing module 15 and the route indicating module 12, and adapted to detect the activity state of the intermediate node which requests the route information. Specifically, the node aging detecting module 16 is adapted to delete the address information of the intermediate node, which remains inactive (namely, exchanges no information with the route indicating module 12) within a preset period, stored in the route request storing module 15, and delete the route configuration information corresponding to the requested route information in order to prevent sending invalid information to the intermediate node which has aged (namely, which is nonexistent or inactive in a long period). This may reduce unnecessary information sending, reduce the amount of sent information, relieve the load of the redirector and improve its working efficiency, and reduce network traffic.

In FIG. 3, the notifying module 14 is additionally adapted to send the new route information intended for replacing the invalid route information to the intermediate node managed by the redirector. After the new route information is sent, the intermediate node may update the invalid route information with the new route information, thus ensuring correct forwarding of service request messages and improving the QoS.

In practice, the route request storing module 15 may be integrated with the route storing module 11.

Figure 4:
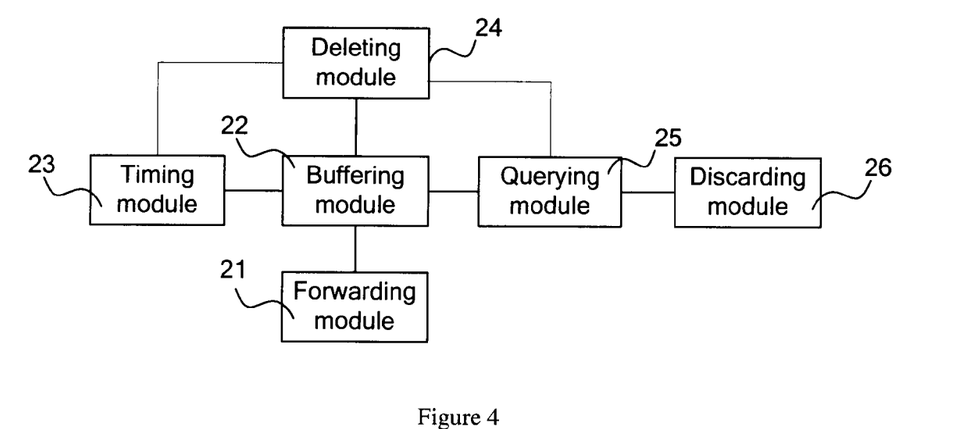
FIG. 4 shows an exemplary structure of a relay provided in the first embodiment of the present disclosure.

FIG. 4 shows a structure of a relay in the first embodiment of the present disclosure. The relay may be an intermediate node for forwarding service request messages, and may include but is not limited to: a forwarding module 21, a buffering module 22, a deleting module 24, a querying module 25, and a discarding module 26, which are communicated consecutively. The buffering module 22 is also communicated with the querying module 25. Moreover, the relay may include a timing module 23 communicated with the buffering module 22 and the deleting module 24. The forwarding module 21 is adapted to forward a service request message according to the route information (route information carried in the route indication information returned by the redirector, or route information which is buffered by the buffering module 22 and falls within the validity period). The buffering module 22 is adapted to buffer the route information which is sent by the redirector and falls within the validity period. The route information sent by the redirector to the relay for buffering has a specified validity period. Therefore, the timing module 23 measures time of the validity period of the route information buffered by the buffering module 22, and notifies the deleting module 24 upon expiry of the validity period. The deleting module 24 is adapted to delete the route information which goes beyond the validity period or is invalid. The querying module 25 is adapted to query whether the invalid route information is subscribed to after receiving a notification about invalidity of route information from the redirector: if the invalid route information is subscribed to, notify the deleting module 24 to delete the invalid route information buffered by the buffering module 22; otherwise, send the notification about invalidity of route information to the discarding module 26. The discarding module 26 is adapted to discard the messages unrelated to the route information buffered by the buffering module 22. In this embodiment, the messages include the notification about invalidity of route information.

When the redirector sends a notification about invalidity of route information to all the managed intermediate nodes, the querying module may query whether the invalid route information is buffered, thus better ensuring to delete the invalid route information correctly.

If the redirector also sends new route information intended for replacing the invalid route information when sending the notification about invalidity of route information, the discarding module 26 may additionally discard the new route information intended for replacing the invalid route information according to the indication from the querying module 25 which indicates discarding of the notification about invalidity of route information. That is, the discarding module 26 discards the message unrelated to the route information buffered by the buffering module 22, including the notification about invalidity of route information and the new route information intended for replacing the invalid route information.

Figure 5:
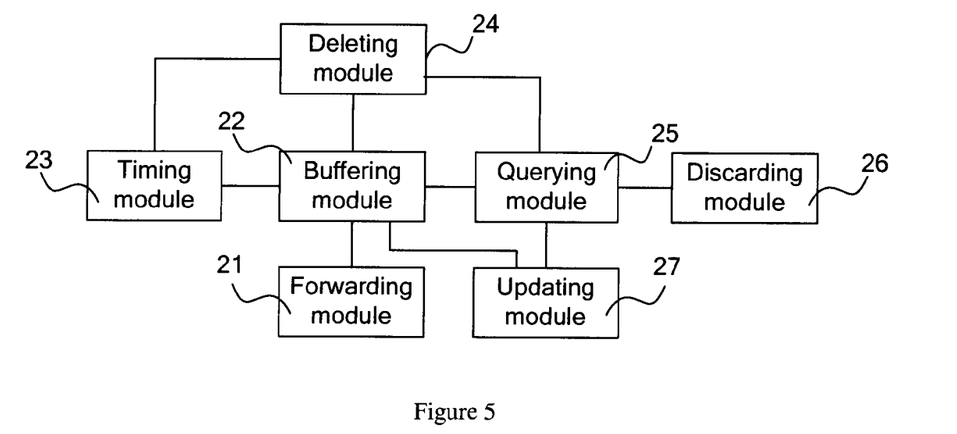
FIG. 5 shows an exemplary structure of a relay provided in the second embodiment of the present disclosure.

FIG. 5 shows a structure of a relay in the second embodiment of the present disclosure. In this embodiment, the relay further includes an updating module 27, which is communicated with the querying module 25 and the buffering module 22, and is adapted to update the invalid route information buffered by the buffering module 22 with the new route information sent by the redirector if the invalid route information sent by the redirector is buffered by the buffering module 22.

The updating module may update the invalid route information to the new route information, thus ensuring the relay to forward service request messages correctly, quickly and timely and improving the QoS.

Figure 6:
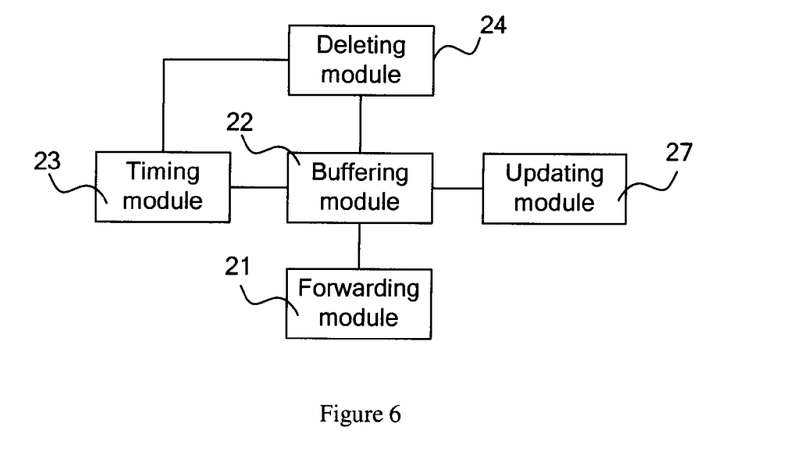
FIG. 6 shows an exemplary structure of a relay provided in the third embodiment of the present disclosure.

FIG. 6 shows a structure of a relay in the third embodiment of the present disclosure. The relay includes: a forwarding module 21, a buffering module 22, and a deleting module 24, which are communicated consecutively, and an updating module 27 communicated with the buffering module 22. Moreover, the relay may further include a timing module 23 communicated with the buffering module 22 and the deleting module 24. In this embodiment, the functions of the modules are the same as the functions of the counterpart modules in the foregoing embodiment. This embodiment differs in that:

In the case that the route information sent by the redirector and buffered in the buffering module 22 is invalid, the updating module 27 updates the invalid route information buffered in the buffering module 22 directly with the new route information sent by the redirector, without querying the buffering module 22 to check whether the corresponding route information is stored, thus saving the time of querying the route information and improving the efficiency of forwarding messages.

Figure 7:
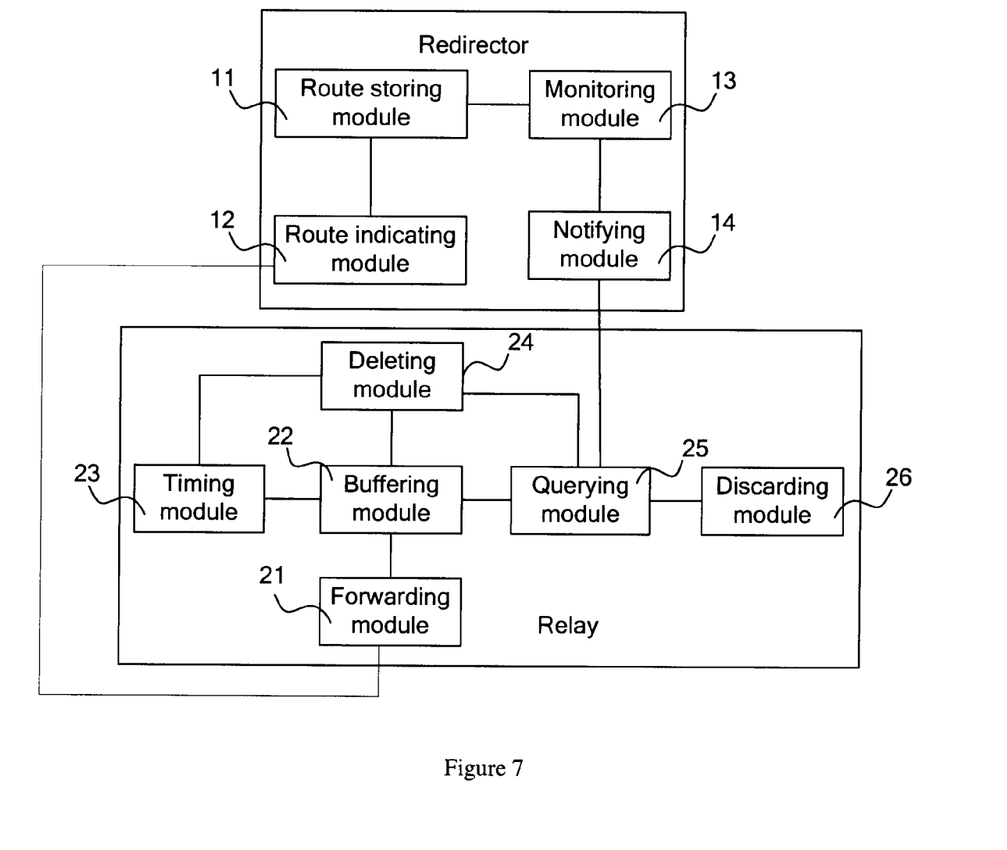
FIG. 7 shows an exemplary structure of a route information configuration system provided in the first embodiment of the present disclosure.

FIG. 7 shows a structure of a route information configuration system provided in the first embodiment of the present disclosure. The route information configuration system includes a redirector and a relay which are communicated. The redirector is shown in FIG. 2, and the relay is shown in FIG. 4. The forwarding module 21 in the relay is communicated with the route indicating module 12 in the redirector in order to request route information from the route indicating module 12 and receive the route indication information returned by the route indicating module 12. The querying module 25 in the relay is communicated with the notifying module 14 in the redirector in order to query whether the invalid route information is subscribed to after receiving the notification about invalidity of route information from the notifying module 14. In this embodiment, the relay may include no timing module 23.

Figure 8:
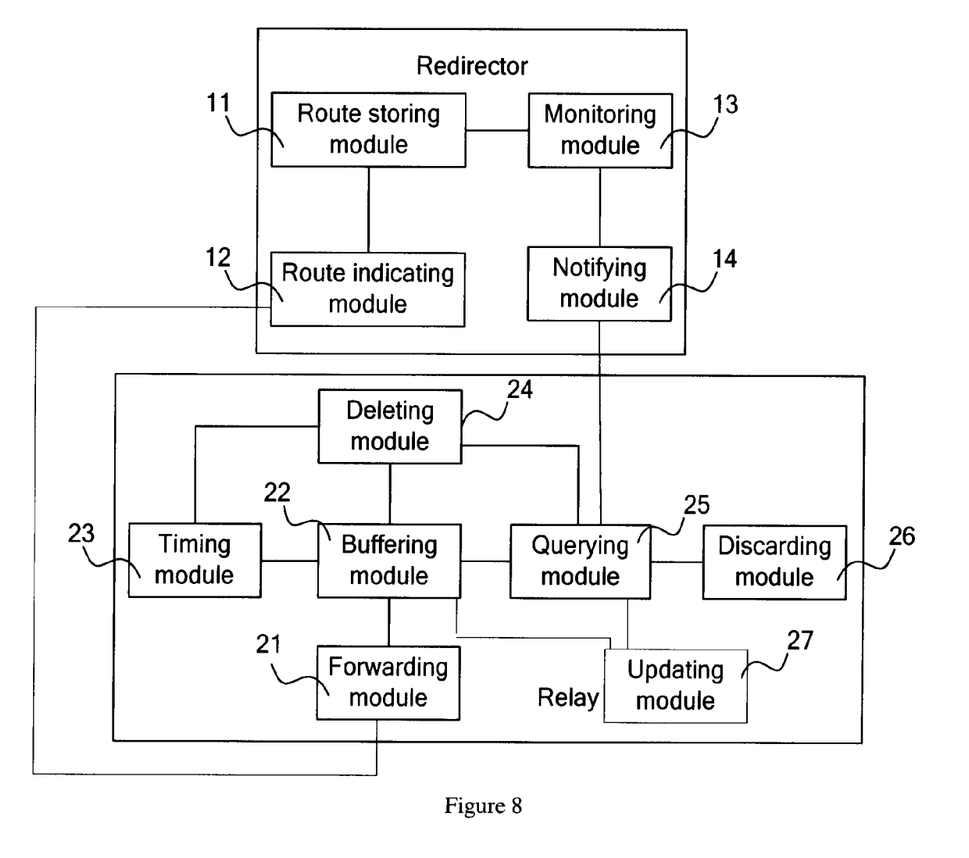
FIG. 8 shows an exemplary structure of a route information configuration system provided in the second embodiment of the present disclosure.

FIG. 8 shows a structure of a route information configuration system in the second embodiment of the present disclosure. In this embodiment, the notifying module 14 may send new route information intended for replacing the invalid route information. The relay shown in FIG. 5 is applied in this embodiment.

Figure 9:
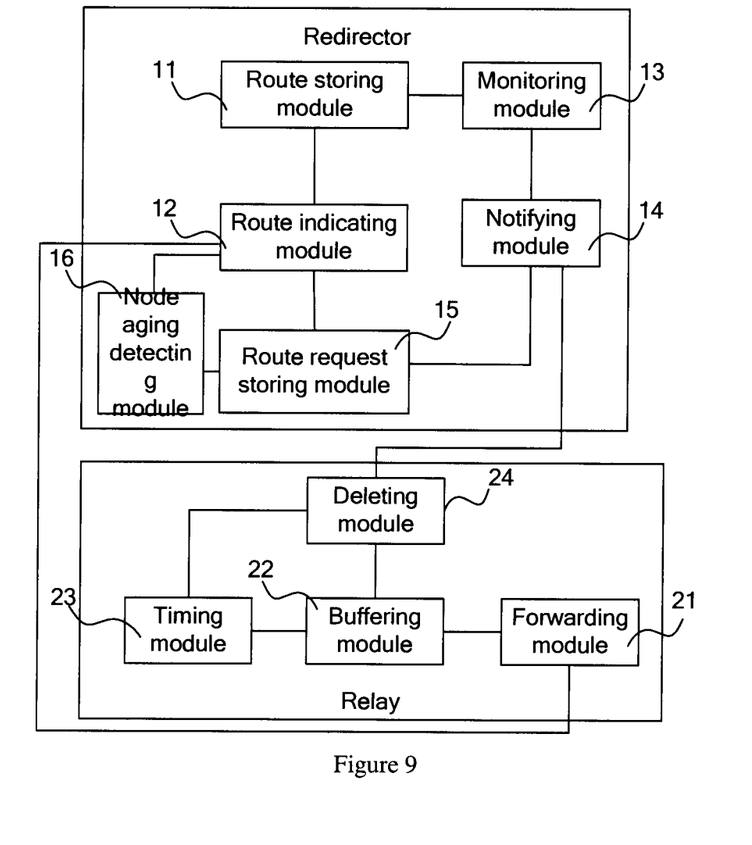
FIG. 9 shows an exemplary structure of a route information configuration system provided in the third embodiment of the present disclosure.

FIG. 9 shows a structure of a route information configuration system provided in the third embodiment of the present disclosure. In this embodiment, the redirector shown in FIG. 3 is applied, and the relay is based on the related art. That is, the system is composed of: a forwarding module 21, a buffering module 22, a deleting module 24, and a timing module 23, which are communicated consecutively. The forwarding module 21 is communicated with the route indicating module 12 in order to request route information from the route indicating module 12 and receive the route indication information returned by the route indicating module 12. The notifying module 14 is communicated with the deleting module 24. The notifying module 14 sends a notification about invalidity of route information buffered by the relay to the deleting module 24, and the deleting module 24 deletes the invalid route information buffered in the buffering module 22 according to the notification sent by the notifying module 14. In this embodiment, the relay may include no timing module 23.

Figure 10:
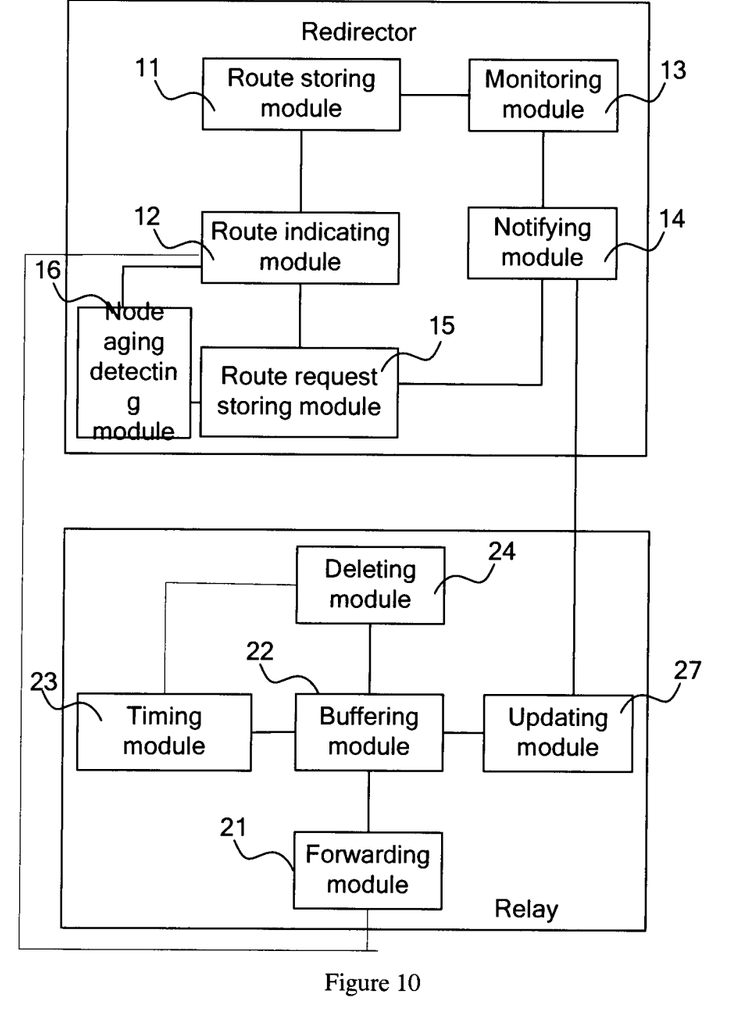
FIG. 10 shows an exemplary structure of a route information configuration system provided in the fourth embodiment of the present disclosure.

FIG. 10 shows a structure of a route information configuration system in the fourth embodiment of the present disclosure. In this embodiment, the notifying module 14 may send a notification about invalidity of route information to the relay which requests the invalid route information, and concurrently sending new route information intended for replacing the invalid route information. Accordingly, the relay shown in FIG. 6 is applied, and the updating module 27 is communicated with the notifying module 14 in order to update the invalid route information stored in the buffering module 22 with the new route information sent by the notifying module 14.

In the route information configuration system shown in FIG. 9 or FIG. 10, the redirector may not include node aging detecting module 16; and the route request storing module 15 may be integrated with the route storing module 11.

Supposing that the relay under the present disclosure receives a service request message sent by the client finds no route information in the buffering module 22, and thus does not determine how to forward the service request message to the destination node, then a redirection request is sent to the redirector because the default route of the relay is a redirector. After receiving the redirection request, the redirector queries the stored route configuration information, obtains the information on the route directed to the destination node, and generates route indication information that carries the route information. The route indication information may also specify a validity period of the route information, namely, the route information can be buffered within the validity period. When the relay receives the same service request message from the client within the validity period of the route information after buffering the route information, the relay may forward the service request message directly according to the previously buffered route information without the need of resending the redirection request to the obtain the route information. The relay may delete the invalid route information and resends a redirection request to the redirector if the validity period of the route information expires or the route node fails. Within the validity period of the route information, if the route configuration information configured in the redirector in a centralized manner changes, the change may be notified to the relay through the foregoing system under the present disclosure in order to update the route information.

Figure 11:
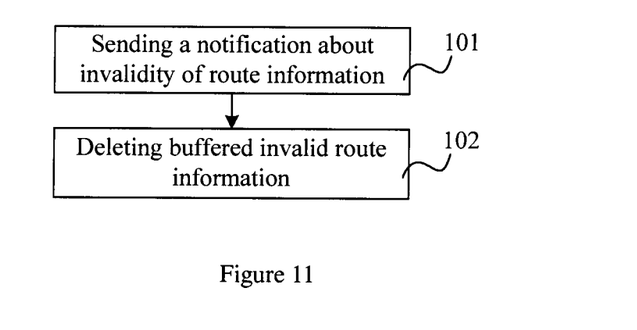
FIG. 11 is an exemplary flowchart of a method for updating route information in an embodiment of the present disclosure.

FIG. 11 provides an exemplary flowchart of a method for updating route information in an embodiment of the present disclosure. For example, the basic flow may include:

Step 101: After change of the route configuration information is detected, a notification is sent, indicating that route information corresponding to route configuration information is invalid.

Step 102: The buffered invalid route information is deleted according to the notification about invalidity of route information.

Once change of the route configuration information is detected, a notification about invalidity of route information is sent, and the invalid route information is deleted in time, thus avoiding this consequence: The service request message is forwarded along the invalid route because the notification of the route information change is not made timely, and therefore, the service message is sent mistakenly. On the occasion that values highly the real time of message interaction and high QoS, the present disclosure overcomes application interruption caused by the mistakenly sent service request.

Figure 12:
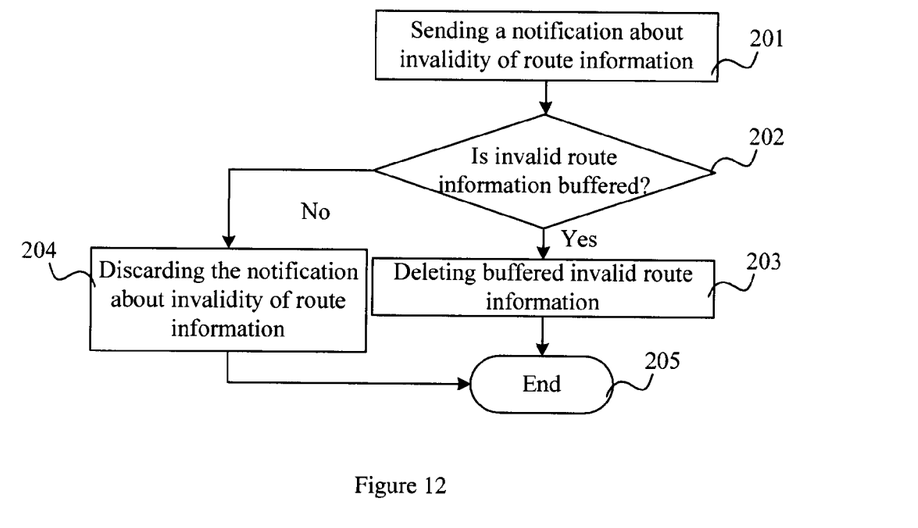
FIG. 12 is an exemplary flowchart of a method for updating route information in the first embodiment of the present disclosure.

FIG. 12 provides an exemplary flowchart of a method for updating route information in the first embodiment of the present disclosure. This embodiment may be implemented based on the route information configuration system shown in FIG. 7, and may include the following steps:

Step 201: When the monitoring module 13 monitors change of the route configuration information stored in the route storing module 11, the notifying module 14 sends a notification about invalidity of route information corresponding to the route configuration information to the querying module 25. The notification may be sent if the domain or application involved by the route information changes.

Step 202: The querying module 25 queries whether the invalid route information is buffered in the buffering module 22. If the invalid route information is buffered, the querying module 25 notifies the deleting module 24 to delete the invalid route information in the buffering module 22, and then process proceeds to step 203. Otherwise, the notification about invalidity of route information is forwarded to the discarding module 26, and then the process proceeds to step 204.

Step 203: The deleting module 24 deletes the invalid route information buffered in the buffering module 22, and then process proceeds to step 205.

Step 204: The discarding module 26 discards the notification about invalidity of route information.

Step 205: End.

Based on the route information configuration system shown in FIG. 8, in step 201, new route information intended for replacing the invalid route information may be sent along with the notification about invalidity of route information. Accordingly, in step 202, if the invalid route information is buffered in the buffering module 22, the querying module 25 sends the notification about invalidity of route information and the new route information to the updating module 27. In step 203, the updating module 27 substitutes the new route information for the invalid route information buffered in the buffering module 22 to accomplish update of the route information.

Figure 13:
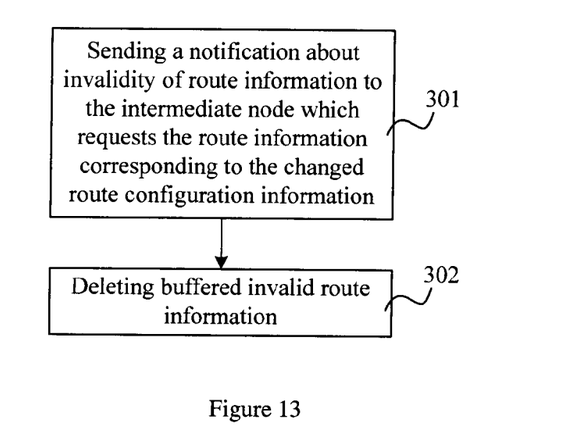
FIG. 13 is an exemplary flowchart of a method for updating route information in the second embodiment of the present disclosure.

FIG. 13 provides an exemplary flowchart of a method for updating route information in the second embodiment of the present disclosure. This embodiment may be implemented based on the route information configuration system shown in FIG. 9, and may include the following steps:

Step 301: When the monitoring module 13 detects change of the route configuration information stored in the route storing module 11, the notifying module 14 queries the route request storing module 15 about the address information of the intermediate node which requests the route information corresponding to the changed route configuration information, and, according to the address information, sends a notification about invalidity of route information corresponding to the route configuration information to the deleting module 24 of the intermediate node.

Step 302: The deleting module 24 deletes the invalid route information buffered in the buffering module 22.

Figure 14:
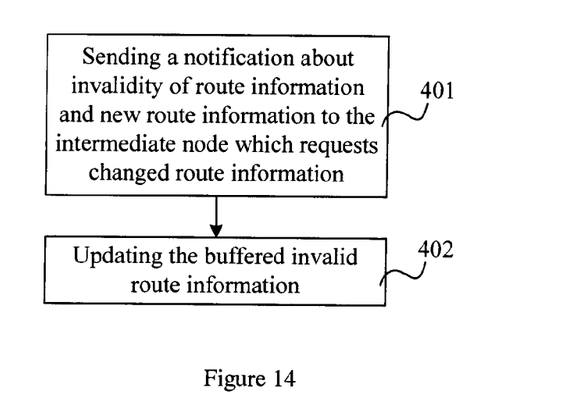
FIG. 14 is an exemplary flowchart of a method for updating route information in the third embodiment of the present disclosure.

FIG. 14 provides an exemplary flowchart of a method for updating route information in the third embodiment of the present disclosure. This embodiment may be implemented based on the route information configuration system shown in FIG. 10, and may include the following steps:

Step 401: When the monitoring module 13 detects change of the route configuration information stored in the route storing module 11, the notifying module 14 receives the new route information corresponding to the new route configuration information from the monitoring module 13, queries the route request storing module 15 about the address information of the intermediate node which requests the route information corresponding to the changed route configuration information, and, according to the address information, sends a notification about invalidity of route information corresponding to the route configuration information and the new route information to the updating module 27 of the intermediate node.

Step 402: The updating module 27 updates the invalid route information buffered in the buffering module 22 with the new route information.

In the embodiments shown in FIG. 13 and FIG. 14, the node aging detecting module 16 may also detect the activity state of the intermediate node which requests the route information in real time, where the activity state is stored in the route request storing module 15. If the intermediate node does not exchange information with the route indicating module 12 within a preset period, the address information of the intermediate node stored in the route request storing module 15 and the route configuration information corresponding to the requested route information are deleted, thus preventing invalid information from being sent to the aged intermediate node and relieving the network load.

In summary, the embodiments of the present disclosure provide the following benefits:

Once change of the route configuration information is detected, the invalid route information is deleted in time, thus avoiding this consequence: The service request message is forwarded along the invalid route because the notification of the route information change is not made timely, and therefore, the service message is sent mistakenly. In cases where real time message interaction and high QoS may be important, the present disclosure overcomes application interruption caused by the mistakenly sent service request. The present disclosure better ensures automatic, quick and timely update of the buffered route information and correct forwarding of the service request message, and improves the QoS.

It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. A method for updating route information, comprising:
   receiving, by a Diameter redirector, a redirection request from a Diameter relay;
   obtaining, by the Diameter redirector, a route from the Diameter relay to a destination node by querying locally stored route configuration information comprising the route from the Diameter relay to the destination node;
   generating, by the Diameter redirector, route indication information, in which the route and a specified validity period of the route are carried;
   sending, by the Diameter redirector, the route indication information to the Diameter relay;
   wherein within the specified validity period of the route, the method further comprises:
      monitoring, by the Diameter redirector, the locally stored route configuration information comprising the route from the Diameter relay to the destination node;
      determining, by the Diameter redirector, the route from the Diameter to the destination node is invalid upon detecting that the route configuration information changes; and
      sending, by the Diameter redirector, a notification to the Diameter relay, the notification indicating that the route from the Diameter relay to the destination node is invalid.

2. The method for updating the route information according to claim 1, wherein sending the notification comprises:
   querying, by the Diameter redirector upon detecting that the route configuration information changes, address information of the Diameter relay; and
   sending, by the Diameter redirector, the notification to the Diameter relay according to the address information.

3. The method for updating the route information according to claim 2, further comprising:
   detecting, by the Diameter redirector, an activity state of the Diameter relay; and
   upon detecting that the activity state is the Diameter relay remains inactive within a present period, deleting, by the Diameter redirector, pre-stored address information of the Diameter relay and the route configuration information corresponding to the route.

4. The method for updating the route information according to claim 1, further comprising:
   detecting, by the Diameter redirector, an activity state of the Diameter relay; and
   upon detecting that the activity state is the Diameter relay remains inactive within a present period, deleting, by the Diameter redirector, pre-stored address information of the Diameter relay and the route configuration information corresponding to the route.

* * * * *